United States Patent [19]

Gardosi

[11] Patent Number: 4,654,512
[45] Date of Patent: Mar. 31, 1987

[54] MACHINE READABLE INFORMATION CARRIER

[76] Inventor: Erwin Gardosi, 10 Rue Jean Engling, L-1466 Luxembourg, Luxembourg

[21] Appl. No.: 733,237

[22] Filed: May 10, 1985

Related U.S. Application Data

[62] Division of Ser. No. 418,415, Sep. 15, 1982.

[30] Foreign Application Priority Data

Sep. 19, 1981 [DE] Fed. Rep. of Germany ....... 3137323

[51] Int. Cl.⁴ .............................................. G06F 15/46
[52] U.S. Cl. .................................... 235/376; 235/492; 340/825.22; 364/468
[58] Field of Search ............... 235/383, 375, 376, 492; 364/468, 469; 340/825.22, 825.35

[56] References Cited

U.S. PATENT DOCUMENTS 4,284,977 8/1981 Yucius et al. .................. 340/825.22
4,380,699 4/1983 Monnier et al. .................... 235/492
4,472,783 9/1984 Johnstone et al. .................. 364/468

Primary Examiner—David L. Trafton
Attorney, Agent, or Firm—Peter K. Kontler; Tobias Lewenstein

[57] ABSTRACT

An information carrying card has an EPROM device. Individual steps of a manufacturing or inventory scheme are operated using the card. Information can be added to or deleted from the card by a central processing unit or a local read/write device. The information carrying device need not be a card and it can constitute or include an EEPROM or an equivalent device.

9 Claims, 4 Drawing Figures

FIG. 3
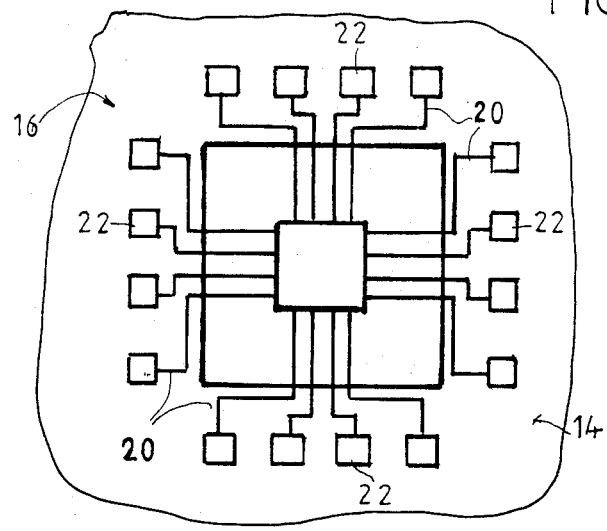
FIG. 2
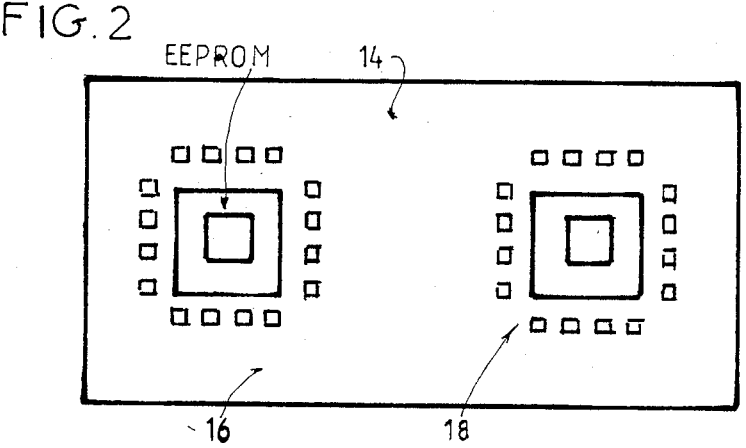
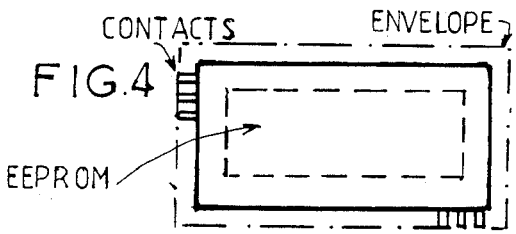
FIG. 4

MACHINE READABLE INFORMATION CARRIER

This application is a division of application Ser. No. 418,415 filed Sept. 15, 1982.

BACKGROUND OF THE INVENTION

This invention is related to machine readable information carriers, and, in particular, to a manufacturing and inventory control card for carrying one or more microelectronic memory devices having a non-volatile, erasable, and programmable memory capability.

Management information systems are widely used for monitoring business operations, especially order entry, manufacturing and inventory control. Such systems include a central computer that is programmed to monitor an order for a product from the initial receipt of the order, through manufacture of the ordered item, until the order is completed by delivery to the customer. Such programmed computers are capable of initiating orders for component parts, if the inventory information available indicates such orders are needed. The computer can also maintain information about the amount and kind of labor and material put into the order so that accurate cost accounting can be maintained.

It is desirable to have a tangible record of machine (computer) readable information physically accompany an order through its various stages of manufacture, assembly, processing and delivery. Such tangible record should include information about the desired characteristics of the ordered entity and be capable of storing data about the entity as the order progresses. Such an information carrier should be durable, capable of withstanding a manufacturing environment, compact, and easy to use.

Punched cards or punched paper tape are typical customary information carriers. But cards and tape are not well suited to manufacturing environments. They are easily damaged or destroyed. Moreover, complex computer systems require more information than can be contained on one card or a short paper tape. So, multiple cards or long tapes are needed, thereby further complicating the handling of such items.

Another well-known information carrier is a magnetic tape cassette. These are small in size and can hold a lot of information. However, experience with such cassettes shows they are highly sensitive to dirt and moisture that are typically present in a manufacturing environment. Magnetic cards are less sensitive to the environment, but they have limited storage capacity. Information on the cards is easily erroneously altered or destroyed when the cards are exposed to spurious magnetic fields that are often found around electrical motors that operate manufacturing machines.

Advances in the state of the art of microelectronics have made available a number of small devices adaptable for information carriers in the manufacturing process. Random access memory (RAM) devices are capable of receiving, storing and deleting data. However, such devices are volatile, depend upon a continuous supply of voltage and all stored information is lost if the voltage supply is interrupted or disconnected. Other, non-volatile devices, such as PROMs (programmable readonly memories) are non not erasable. Information can be entered into a PROM and the PROM will retain the information, even in the event of a power failure. However, since a PROM can only be used once, it would be too expensive and not a practical information carrier for a management information system.

OBJECTS AND SUMMARY OF THE INVENTION

An object of the invention is to provide a compact information carrier which can receive, add, store, and delete information.

It is another object to provide an information carrier having a non-volatile memory, independent of a power source.

A further object is to provide an information carrier that is capable of withstanding a harsh manufacturing environment.

A still further object is to provide a reusable manufacturing information carrier on which information can be recorded in machine readable form and erased.

In accordance with the invention, such objects are accomplished by an information carrying card which is equipped with one or more EPROM devices that are programmable, and erasable in part or entirely. Such EPROMs are capable of receiving and storing data, changing stored data and being entirely reprogrammed under the direction of a stored program in a host computer at a central location.

EPROM devices which are used to constitute the novel information carriers are known per se. However, heretofore, they have not been used for the purposes of the present invention. The number of EPROM devices which can be applied to an information carrying card depends on the maximum desired amount of information to be stored.

The novel information carrying card exhibits a number of advantages. The lifetime cost of such information carrying cards and readers which exhibit a programming possibility is low since the cards can be reused hundreds of times. The card is not sensitive to contamination and moisture and the data which are stored thereon are transferrable without manual intervention. A small number of terminals is needed to transfer data to a central computer, and such terminals can be used also for data which are to be transferred from the computer to and stored in the card. Therefore, the possibility that a user of the card may commit an error during transfer of data is minimized. Since the data which are stored on the card are available to the user only to the extent necessary, depending on the nature of the reader and the mode of encoding the information on the card, the data are protected once they are stored on the card. Hence, the data on the card are secure and can be kept confidential.

For example, the novel information carrying card is capable of accepting (storing) working programs of which only a selected one is visible to the owner upon insertion of the card into a reader. Moreover, by transfer of data the information carrying card can be used to report the start or the termination of an operation, as well as other information which relates to an operation, to a central location. Furthermore, accompanying operations, such as for example the making ready of the necessary materials, can be initiated by the card. There exists the possibility, for example, by data transmission from an electronic counting weigher to the central location and simultaneously from the central location to the card, to store additional information on the card. Here, one could also consider the possibility of blocking the repetition of operations which are already completed by appropriate encoding of the card. Since the EPROM is capable of storing and executing programs, the central computer is relieved of the burden of monitoring each routine task of manufacturing. Thus, the EPROM equipped card helps decentralize a computer controlled process and frees the central computer for more important tasks.

Since the EPROM devices may have memory storage capacity of 64,000 bits of data, it is possible to use the invention to keep track of the labor expended on a work item as well as the identity of the laborer. Thus, one card can store information pertaining to work already completed and the identity of the worker, and another card can record work which is to be credited to the worker.

In the event of failure of the central computer, there is no need to provide a safety or secondary computer. Computer controlled machines are adaptable to accept programs stored on the EPROM and so the manufacturing process can be operated independently of the central computer. The information which is stored on the card can be transmitted instantaneously to the central computer by the simple expedient of inserting the card into a terminal. The detection or reading of data takes place ON-LINE. So long as the cards are in a reader/printer, the central computer can periodically receive data regarding the current status of all operations while the operations are in progress.

The novel features which are considered as characteristic of the invention are set forth in particular in the appended claims. The improved information carrier itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a mechanical schematic of the information carrying card of the invention.

FIG. 3 is a broken away enlarged drawing of a portion of FIG. 2.

FIG. 4 is a schematic perspective view of an information carrier which is not a card.

DESCRIPTION OF THE PREFERRED EMBODIMENTS

Figure 1:
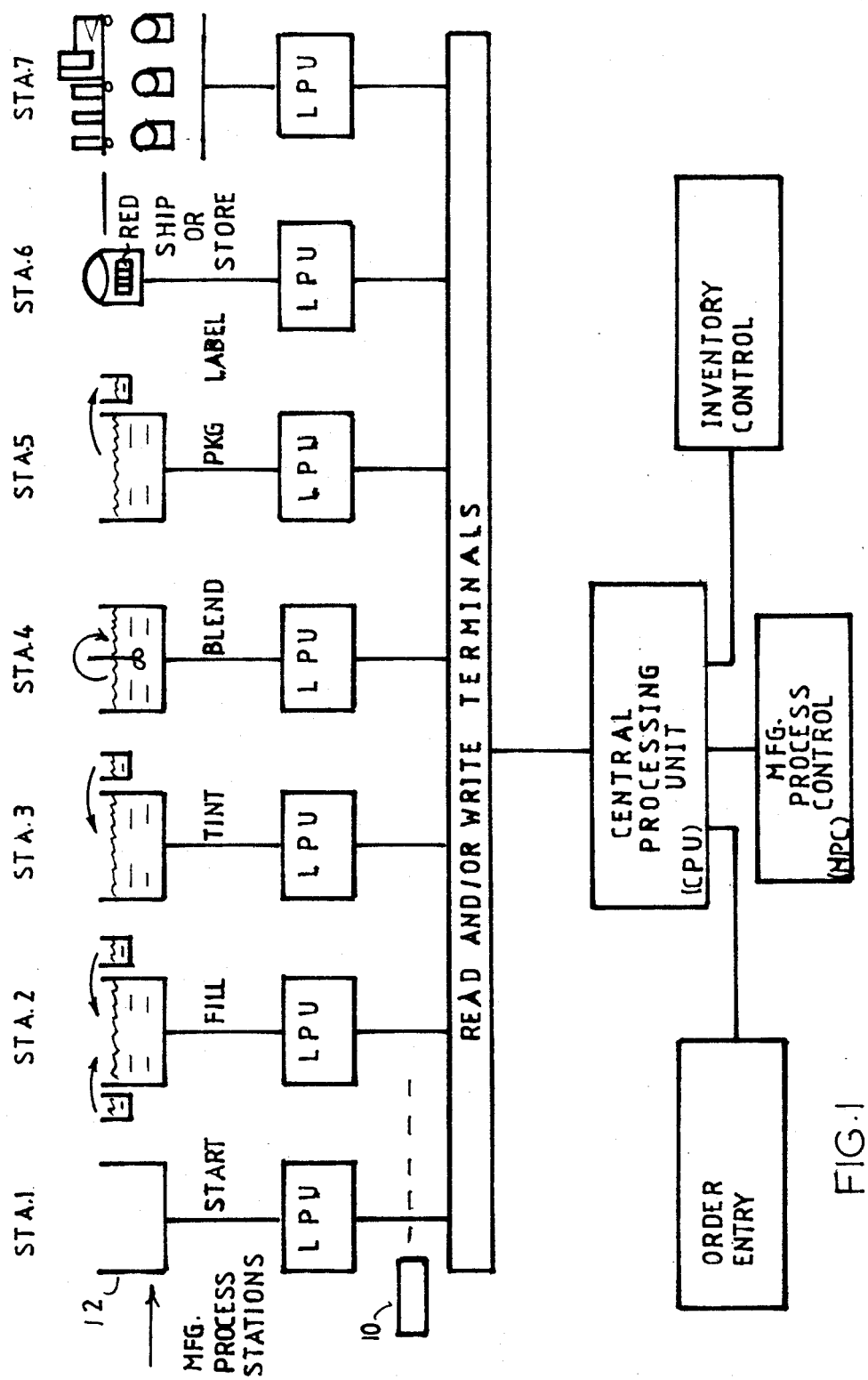
FIG. 1 is a schematic chart of a computer controlled process.

Turning now to the drawing, and, in particular to FIG. 1, there will be described a simplified paint blending and tinting process. The following description is used to show only one of the many and varied uses of the invention, and in no way limits the scope of the invention to the simplified process discussed.

In the illustrated process, there are seven stations. Each station is controlled by a local processing unit or LPU. The LPU at any station may be a computer or operator controlled machine. In either case, the LPU receives information from a central processing unit CPU or an information carrying card 10 or both.

In the illustrated example, a card 10 would be preprogrammed or encoded with data by the CPU based upon information generated by an order from a customer. The CPU would first search its inventory memory to see whether the order could be filled from existing stock. Assuming the customer has ordered two gallons of red paint, the CPU, in accordance with a predetermined program, will direct the manufacturing process control MPC to produce five gallons. Two will be shipped and three will be for future use, since past experience indicates red is a popular color and the manufacturing process is most efficient when five gallons are made.

Thus, card 10 is encoded to see that five gallons of red paint are produced. At station 1, a suitable tank 12 is selected and transported to station 2. There LPU 2 receives instructions from card 10 via a read/write terminal to fill tank 12 with five gallons of tint base. Upon suitable completion of the fill task, the tank 12 is passed to its next station where red tint is added.

The start, operation and completion of any task at any station is entirely under the control of the LPU. As mentioned above, the latter may be a fully automatic computer controlled machine, or an operator, or a semiautomatic machine under operator control. In any case, the card 10 with its data will delay the start of any subsequent operation until the earlier required operation is completed.

The remaining operations, including blending, packaging, labelling, shipping and storing are apparent. At any time, any station may be in operation or idle. The CPU can monitor this activity and maximize the use of the stations in accordance with orders entered and inventory. Likewise, if a customer changes an order (blue instead of red), the CPU can change the data on card 10 to call for a new color tint at station 3 or take other suitable action.

Turning to FIGS. 2 and 3, the card 10 comprises a substrate 14 of a suitable, durable material, such as plastic. One or more EPROM devices 16, 18 are mounted on the card. Each EPROM is connected via a plurality of fine wires 20 (FIG. 3) to a corresponding plurality of electrical contact pads 22. Such pads are adapted to be electrically connectable to a read/write device.

Data in the form of binary (one, zero) electrical pulses are transmitted to and from the EPROM via pads 22 and lines 20. The EPROM will store data for later reading without the need for a source of power. Hence, if there is a power failure, the entire blending process can be restarted without any loss of data. Upon completion of the process, the EPROM can be erased in whole or in part and reused. Erasure is made in accordance with the particular characteristics of the EPROM. Some devices use a predetermined voltage; others are erasable upon exposure to light of a given wavelength, usually ultraviolet.

The improved data carrier need not necessarily assume the form of a card. For example, the data carrier can constitute or resemble a substantially box-like structure which can be placed into a suitable envelope (see FIG. 4). Also, EPROM is but one form of the devices which can be used in accordance with the present invention; for example, an EEPROM can be used with equal advantage.

Having thus described my invention, those skilled in the art will recognize that it may be used in many forms without departing from the spirit and scope of the following claims.

I claim:

1. A method of controlling a manufacturing process, comprising dividing the process into a plurality of selected information controlled steps; placing each selected step under control of an information carrying card equipped with an erasable programmable memory; recording in the memory information in machine readable form about the execution of each step; executing each step in accordance with the information stored in the memory; and exchanging machine readable information between the memory and a central processing unit.

2. The method of claim 1, further comprising using a reading and writing device to exchange machine readable information between the memory and the central processing unit.

3. The method of claim 1, comprising changing the recorded information for a predetermined step in dependence upon a preceding step.

4. The method of claim 3, wherein the recorded information for the predetermined step in changed by erasing at least a portion of the recorded information.

5. The method of claim 3, wherein the recorded information for the predetermined step is changed by replacing at least a portion of the recorded information with new information.

6. The method of claim 3, wherein the recorded information for the predetermined step is changed bit-by-bit.

7. The method of claim 1, wherein the memory is non-volatile.

8. The method of claim 1, wherein the memory is an EEPROM.

9. The method of claim 1, wherein the memory is erasable both entirely and in part.

* * * * *